United States Patent
Bergstrom

(10) Patent No.: US 7,160,446 B2
(45) Date of Patent: Jan. 9, 2007

(54) PORTABLE SPA FILTER HOUSING WITH FLOW SPLITTER

(75) Inventor: Neil Bergstrom, La Mesa, CA (US)

(73) Assignee: Watkins Manufacturing Corporation, Vista, CA (US)

( * ) Notice: Subject to any disclaimer, the term of this patent is extended or adjusted under 35 U.S.C. 154(b) by 137 days.

(21) Appl. No.: 10/886,205

(22) Filed: Jul. 7, 2004

(65) Prior Publication Data

US 2006/0006105 A1    Jan. 12, 2006

(51) Int. Cl.
 *B01D 29/17* (2006.01)
 *E04H 4/12* (2006.01)

(52) U.S. Cl. .................. 210/167; 210/169; 210/416.1; 210/416.2; 210/460; 4/492; 4/507

(58) Field of Classification Search ............... 210/169, 210/175, 416.1, 416.2, 435, 459, 460, 167; 4/492, 507
See application file for complete search history.

(56) References Cited

U.S. PATENT DOCUMENTS

| | | | | |
|---|---|---|---|---|
| 904,678 A | * | 11/1908 | Brunner | 210/440 |
| 3,168,470 A | * | 2/1965 | Rhoda | 210/239 |
| 3,297,163 A | * | 1/1967 | Landon | 210/331 |
| 3,555,574 A | * | 1/1971 | Stanwood | 4/512 |
| 3,733,267 A | * | 5/1973 | Haase | 210/669 |
| 4,108,775 A | * | 8/1978 | Wilkes et al. | 210/169 |
| 4,349,434 A | * | 9/1982 | Jaworski | 210/94 |
| 4,362,618 A | * | 12/1982 | Cook et al. | 210/275 |
| 4,460,462 A | * | 7/1984 | Arneson | 210/163 |
| 4,780,197 A | * | 10/1988 | Schuman | 210/136 |
| 4,798,670 A | * | 1/1989 | Treene | 210/169 |
| 4,818,389 A | * | 4/1989 | Tobias et al. | 210/169 |
| 2002/0152732 A1 | * | 10/2002 | Kallsen et al. | 55/482 |
| 2005/0023209 A1 | * | 2/2005 | Clausen et al. | 210/436 |
| 2005/0067339 A1 | * | 3/2005 | McClure et al. | 210/169 |

\* cited by examiner

*Primary Examiner*—Fred G. Prince

(57) ABSTRACT

A filter housing for a portable spa utilizes a coaxial channel structure at the flow output of the filter housing to separate the water flow from the filter housing. In one embodiment, the water from the filter housing, exiting at the bottom of the housing, is piped by way of a high pressure pump, to the jets in the spa. The water from the filter housing taken at about halfway between the top and bottom of the filter housing is piped, by way of a circulation pump to a heater and a water purifier system back into the spa, preferably to a return aperture in the footwell of the spa. In another embodiment water exiting the filter housing is split into separate flow paths at the bottom of the filter housing, to the jets in the spa and into the circulation loop back into the spa.

17 Claims, 4 Drawing Sheets

PORTABLE SPA FILTER HOUSING WITH FLOW SPLITTER

BACKGROUND OF THE INVENTION

1. Field of the Invention

The present invention relates generally to improvements in portable spa filters and filter housings, and more particularly pertains to new and improved means for splitting water flow out of the filter housing into separate circulation loops.

2. Description of the Prior Art

In the field of portable spas, it has been the practice to employ an array of flow fittings and check valves to split the water flow from the filter housing into two separate circulation loops, one loop being through a high pressure pump to the jets of the spa, the other loop being through a circulating pump, and a heater, back to the spa. Flow splitting, as performed by the prior art, has been unsatisfactory in that a lot of piping, as well as expensive check valves, are required. Furthermore, turbulence is created in the water flow. The present invention alleviates these problems.

SUMMARY OF THE INVENTION

To increase water flow through the filter, eliminate the requirement for a check valve in the high pressure line, and reduce the number of fittings, a coaxial channel structure is used at the output of the filter housing of the portable spa. The water from the surface of the portable spa enters a filter housing and passes through a filter membrane before it is split into two separate circulation loops. In one embodiment, the split in flow is accomplished by drawing water from the filter at two physically spaced locations in the filter housing. A first exit is located at the bottom of the filter housing. A second exit is located between the top and bottom of the filter membrane, preferably about halfway between the top and bottom of the filter membrane. In an alternate embodiment, the split in flow is accomplished by drawing water from the filter at one exit point into two separate flow paths.

BRIEF DESCRIPTION OF THE DRAWINGS

The objects and many of the attendant advantages, as well as the exact nature of this invention, will become readily apparent upon consideration of the following detailed description, when combined in conjunction with the accompanying drawings, in which like reference numerals designate like parts throughout the figures thereof, and wherein.

DETAILED DESCRIPTION OF THE PREFERRED EMBODIMENTS

Figure 1:
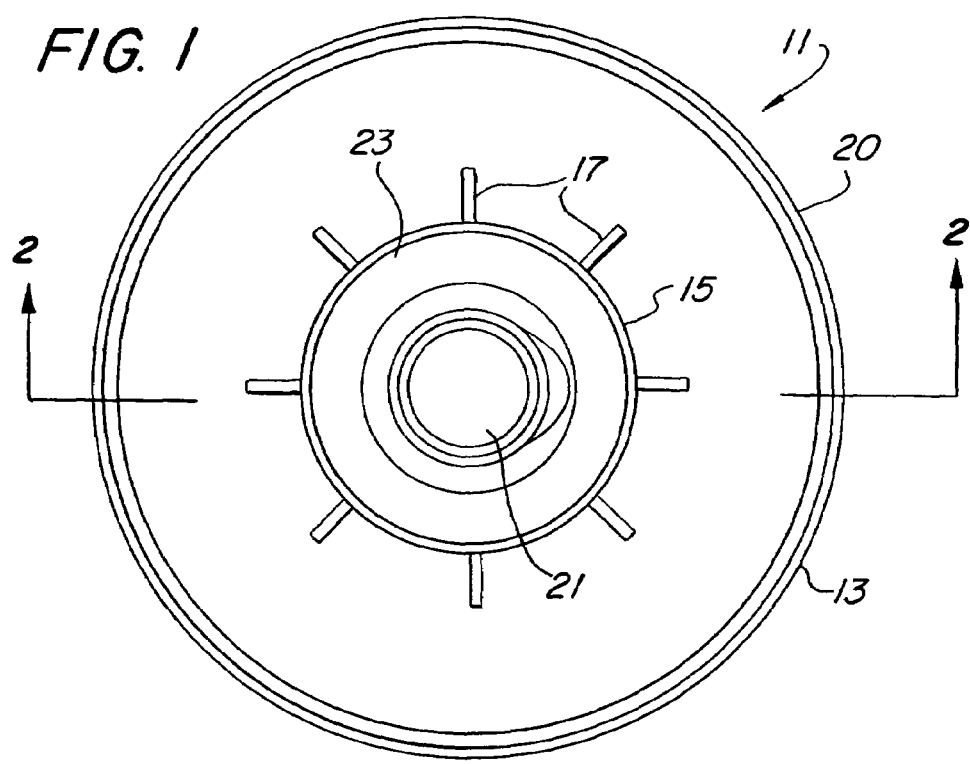
FIG. 1 is a top view of a filter housing according to the present invention.

Referring first to FIG. 1, a preferred embodiment of a filter housing 11 according to the present invention is illustrated as having a cylindrical holder 13 adapted to receive and hold a cylindrical filter membrane 14 and a filter bucket 16 (FIG. 3), as will be more fully described hereafter.

Figure 3:
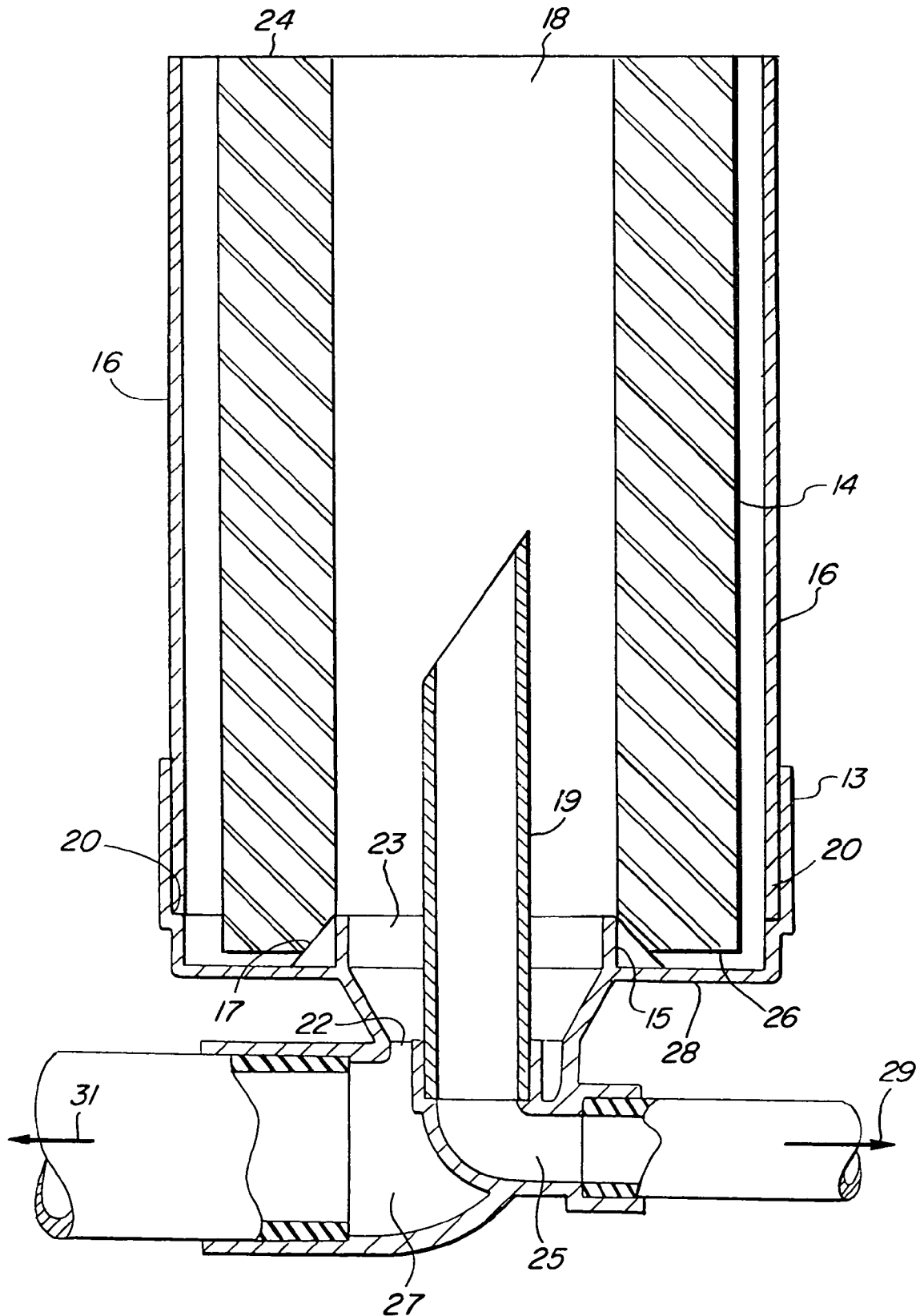
FIG. 3 is a cross-section taken along line 2—2 of FIG. 1, with a filter membrane and filter bracket added.
Figure 4:
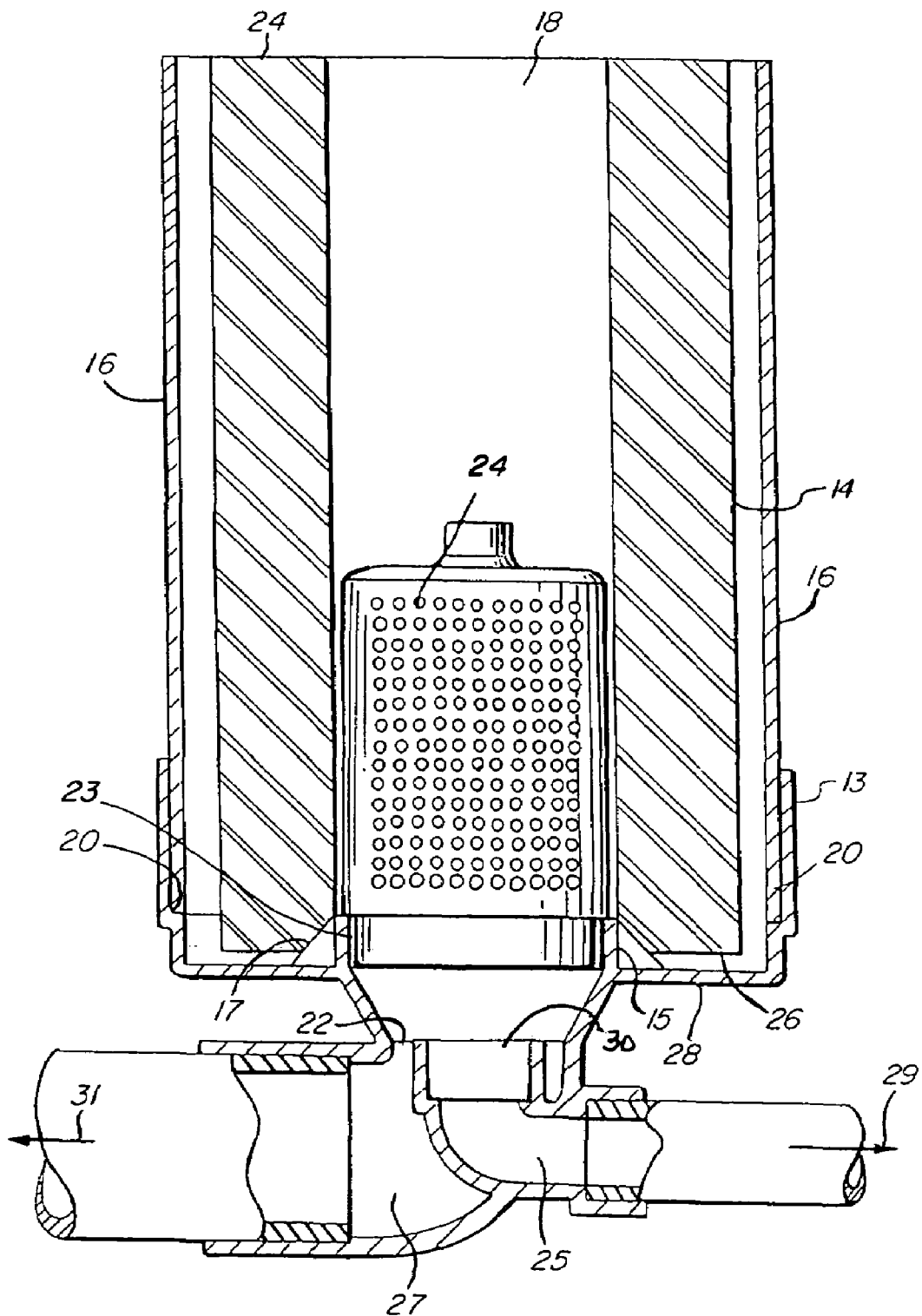
FIG. 4 is a cross-section taken along line 2—2 of FIG. 1 showing an alternative embodiment.

The filter membrane 14 has a cylindrical hollow center 18 that fits around a cylindrical support riser 15 which is structurally supported by abutments 17 around its periphery (FIGS. 3, 4).

A first exit aperture 23 is located at the bottom or base 28 of the filter holder 13 which holds the filter membrane 14 and filter bucket 16 (FIG. 3). A second exit aperture 21 is located within the first exit aperture 23.

The second exit aperture 21 is the open end of a channel 19 which may be an upstanding pipe of a predetermined length. The length of channel 19 pipe determines the location of the second aperture 21 within the filter membrane, as will be more fully described hereinafter.

The holder 13 is adapted to hold the discharge end of a cylindrical filter membrane. As shown in FIG. 3, the filter membrane 14 is supported by the cylindrical support riser 15 so that the cylindrical internal cavity 18 ends in a space 23 at the discharge end of the filter membrane 14 for water to flow into the first opening 22 of a diverter 27 which is connected to a first circulation loop 31.

A second aperture 21 which is located coaxial to and within the perimeter of the first exit aperture 23 is shown as an angled cut on a channel pipe 19 that channels water entering at the second aperture 21 into a separate second diverter 25 within diverter 27. The second diverter 25 is connected to a second circulation loop 29.

The pipe channel 19 is chosen to be a preselected length so as to locate the second exit aperture 21 at a precise location within filter membrane 14 (FIG. 3) and at a precise distance from the first exit aperture. The result of this is that water flowing out the bottom 28 of holder 13 is directed into a first circulation loop 31, whereas filtered water taken at a spaced distance from the first exit aperture is directed to a second circulation loop 29.

One of the advantages of having a second exit aperture 21, 24 located within the hollow core 18 of filter membrane 14 while the first exit aperture 23 is located at the bottom 26 of filter membrane 14 is that the water flow through both exits and the two circulation loops tend to be more laminar and less turbulent. Varying the size and location of the second exit aperture 21, 24 within the hollow core 18 of filter membrane 14, will also allow for the adjustment of flow characteristics through the filter membrane.

FIG. 3 illustrates a cross-section of a cylindrical filter membrane 14 having a top 24 and a bottom 26. The bottom portion 26 of the filter membrane 14 is located within filter holder 13. Filter member 14 is shown as a cylindrical filter with a hollow cylindrical core 18. The hollow core 18 has a diameter slightly larger than the first aperture 23 in the bottom of holder 13 so that it fits around the support user 15. A pipe channel 19 is located within the hollow cylindrical core 18 of filter membrane 14. The pipe channel 19 is shown as having a sharply angled cut creating a second exit aperture at its end with a certain size opening for channel 19 which may be larger in surface area than the channel 19.

FIG. 4 illustrates an alternate embodiment of the invention. A filter grate 24, which has a plurality of apertures, covers the only exit aperture 23. Exit aperture 23 is physically split by two separate exit apertures 22 and 30 which empty into respective diverter 27 and 25.

A filter bucket 16, preferably cylindrical in shape, fits around the outside of filter membrane 14, is held by the sides of filter holder 13, and rests on a peripheral ledge 20 within holder 13.

Figure 5:
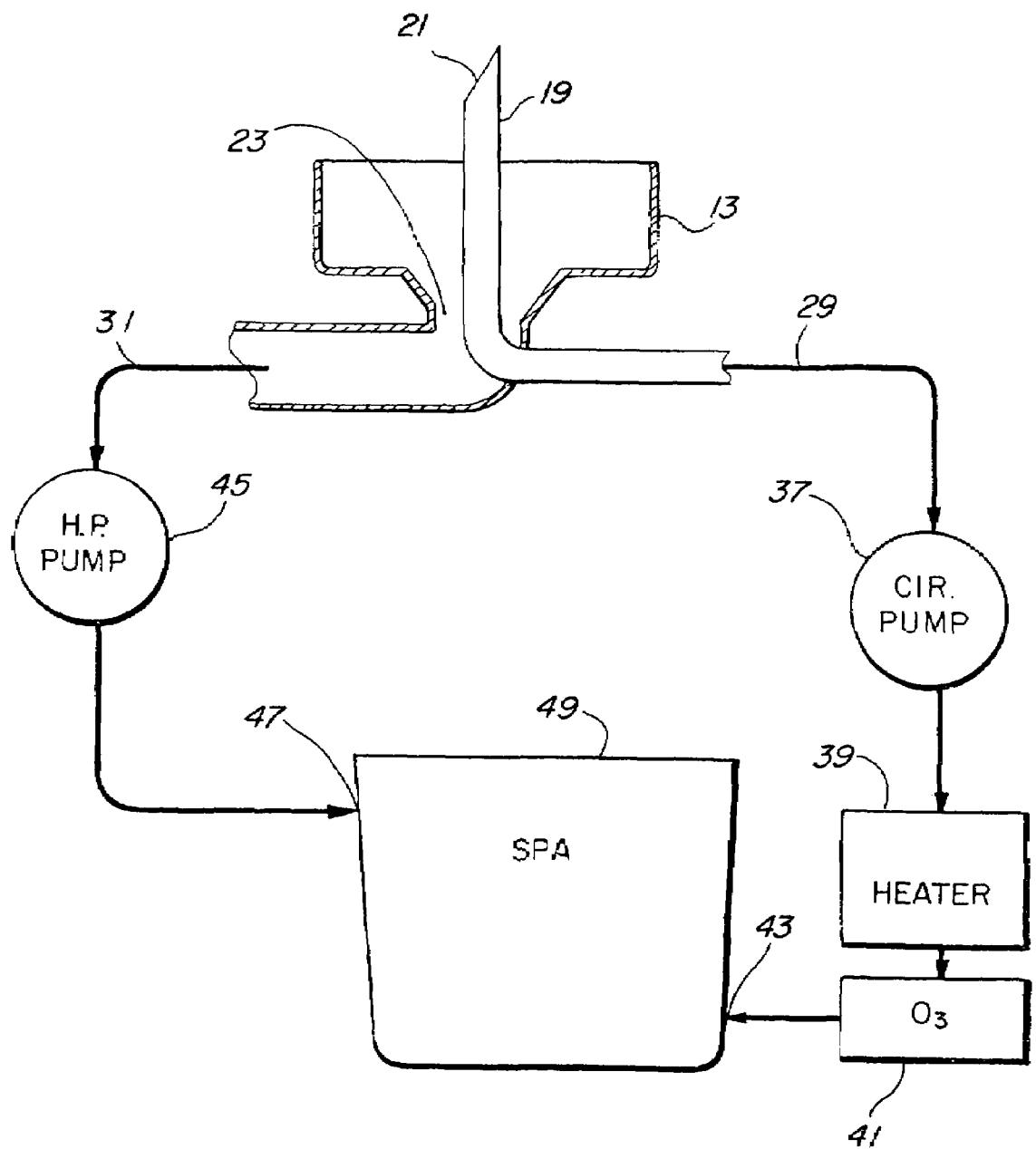
FIG. 5 is a diagrammatic illustration of the invention in the fluid flow circulation loops of a portable spa.

Referring now to FIG. 5 which illustrates the connection of the filter holder 13 to two circulation loops of the portable spa, one should remember that the filter holder 13 is located within a partial enclosure in the wall of the portable spa which allows water to flow to and through the filter membrane 14 (FIGS. 3, 4) into its hollow core.

The first exit aperture 23/22 of the holder 13 causes filtered water from the filter membrane to be directed into a first circulation loop 31 which contains a high pressure pump 45 that is connected to jets 47 in the portable spa 49, to cause higher pressure water flow through these jets.

Figure 2:
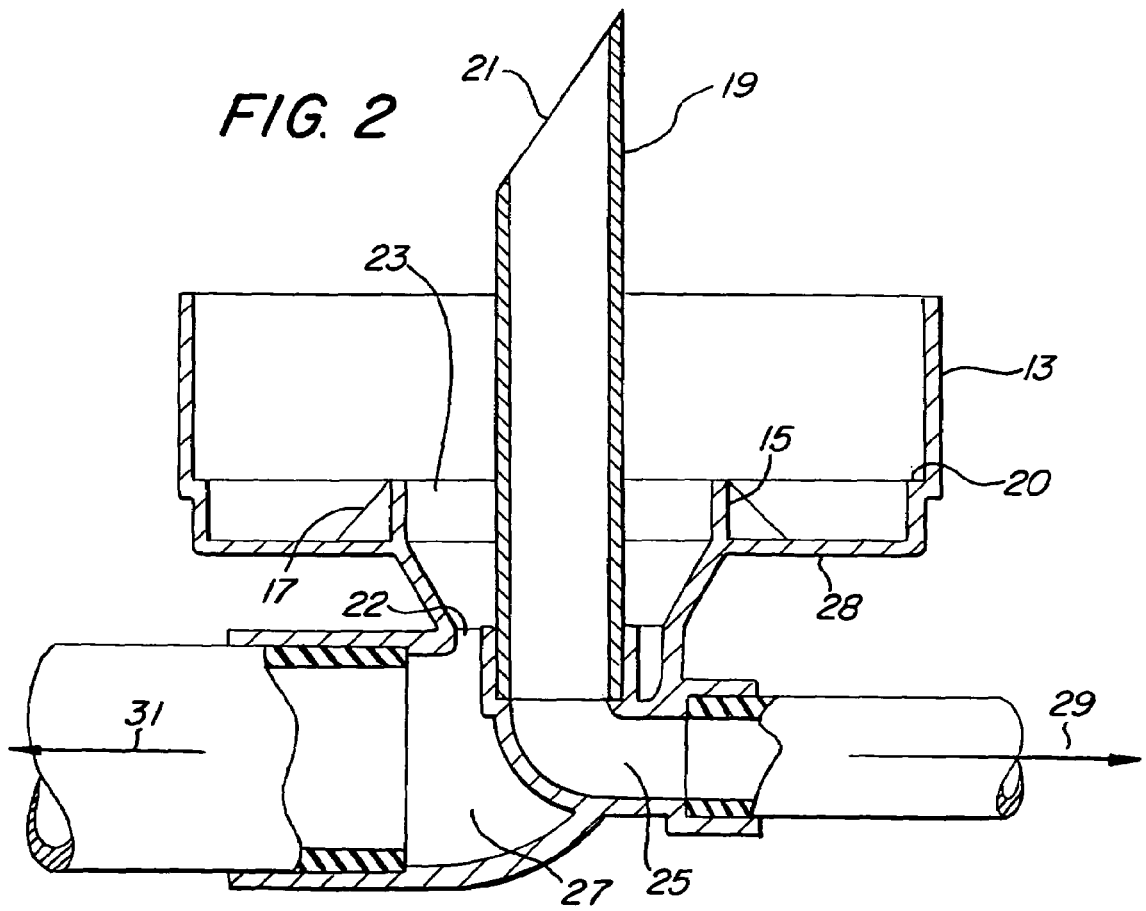
FIG. 2 is a cross-section taken along line 2—2 of FIG. 1, looking in the direction of the arrows.

The second exit aperture 21 of the holder 13, which is at the end of pipe channel 19 located some distance from the first exit aperture 23/22, and preferably about halfway between the top and bottom of the filter membrane 14 (FIGS. 2, 3) causes filtered water from the filter 14 to be split into a second circulation loop 29 which contains a circulation pump 37, a water heater 39, and an ozone generator 41. The output of the ozone generator 41 is supplied to a discharge aperture, preferably in the footwell 43 of spa 49. This second circulation loop 29 essentially maintains the temperature of the water in the portable spa 41 and performs additional cleansing by way of the ozone generator 41.

In the alternate embodiment of FIG. 4, the flow through the first exit aperture 22 is directed by the flow diverter 27 into the first circulation loop 31. The flow through the second exit aperture 30 is directed by the flow diverter 25 into the second circulation loop 29.

The advantages of the filter housing with flow splitter of the present invention is that piping from the filter holder 13 into the first and second circulation loops 31, 29, respectively, is simple and direct. By taking filtered water out of the filter holder 13 at two different levels, a more robust flow through the filter is encouraged. In either embodiment, no check valve is needed in the first circulation loop to prevent water from the first circulation loop entering the second circulation loop. The plumbing is significantly simplified, and the flow through the circulation loops tends to be more laminar and less turbulent.

What is claimed is:

1. In a portable spa having a first circulation loop and a separate second circulation loop, a filter housing comprising:
   a filter membrane having a top and bottom and a hollow core; and
   a holder for receiving the filter membrane and allowing water from the spa to be drawn into the filter membrane, the holder having a first exit aperture for water passing through the filter membrane, and a second exit aperture within the hollow core of the filter membrane for water passing through the filter membrane, the first exit aperture directing water flow into the first circulation loop, at the same time that the second exit aperture directs water into the second circulation loop.

2. The filter housing of claim 1 wherein the holder is cylindrical and the filter membrane is cylindrical.

3. The filter housing of claim 2 wherein the first exit aperture is at the bottom of the holder.

4. The filter housing of claim 3 wherein the second exit aperture is about halfway between the top and bottom of the filter member.

5. The filter housing of claim 4 wherein the second exit aperture is the end of a channel running through the first exit aperture.

6. The filter housing of claim 5 wherein the second exit aperture is larger in surface area than the diameter of the channel.

7. The filter housing of claim 6 wherein the second exit aperture is the open end of the channel cut at an angle to the horizontal.

8. The filter housing of claim 3 wherein the second exit aperture is at the bottom of the holder.

9. The filter housing of claim 8 further comprising a filter grate within the hollow core of the cylindrical filter membrane covering the first and second exit apertures.

10. The filter housing of claim 1 wherein the first exit aperture is at the bottom of the holder.

11. The filter housing of claim 1 wherein the second exit aperture is displaced from the first exit aperture within the hollow core of the filter membrane.

12. The filter housing of claim 11 wherein the second exit aperture is at about the halfway point between the top and bottom of the filter membrane within the hollow core of the filter membrane.

13. The filter housing of claim 12 wherein the second exit aperture is the end of a channel running through the first exit aperture.

14. The filter housing of claim 13 wherein the second exit aperture is larger in surface area than the diameter of the channel.

15. The filter housing of claim 14 wherein the second exit aperture is the open end of the channel cut at an angle to the horizontal.

16. The filter housing of claim 15 further comprising a filter grate within the hollow core of the filter membrane covering the first and second exit apertures at the bottom of the holder.

17. The filter housing of claim 1 wherein the first exit aperture and second exit aperture are at the bottom of the holder.

* * * * *